Oct. 26, 1926.   1,604,596
H. C. ODENKIRK
DISK WHEEL FOR VEHICLES
Filed Dec. 22, 1925
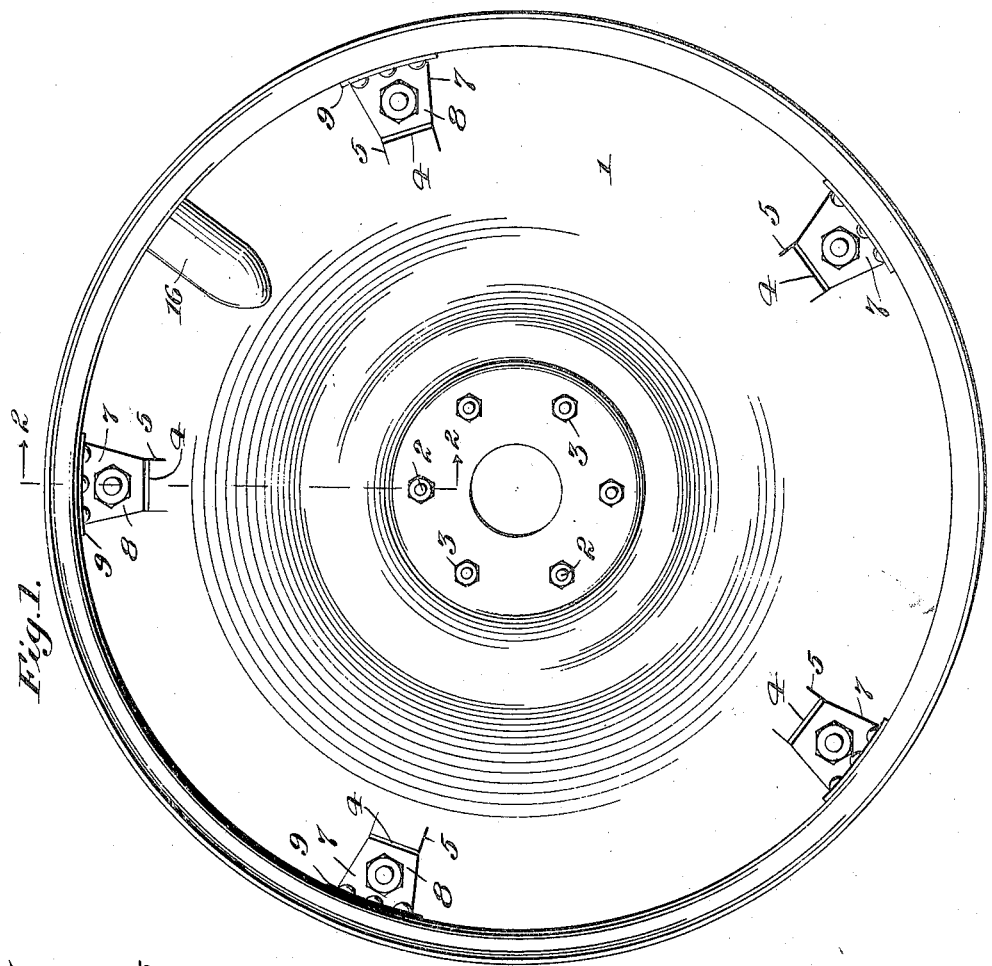
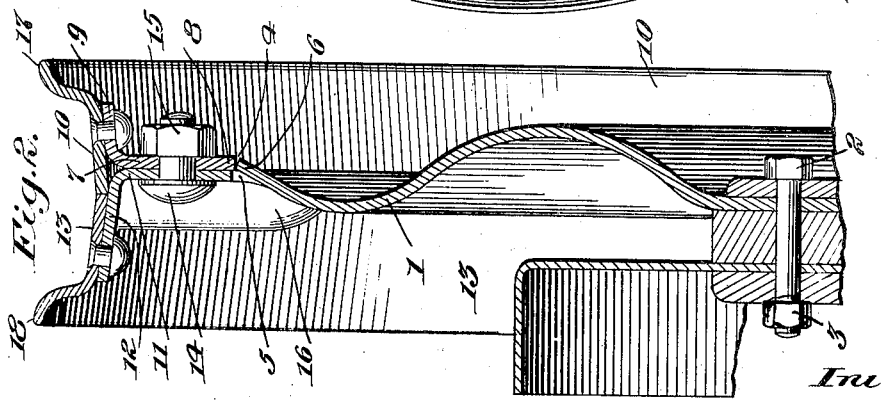
Inventor:
Harry C. Odenkirk
by Jas. L. Skidmore
his Att'y.

Patented Oct. 26, 1926.

1,604,596

UNITED STATES PATENT OFFICE.

HARRY C. ODENKIRK, OF CLEVELAND, OHIO.

DISK WHEEL FOR VEHICLES.

Application filed December 22, 1925. Serial No. 77,011.

This invention relates to an improved and novel construction of wheel especially designed to be utilized as a wheel for automobile and motor vehicles of various kinds, and more particularly to a wheel of what is known as the disk type.

The main object of the invention is to provide a simple, durable, economical and efficient wheel possessing the required strength and to be utilized in connection with automobiles, said wheel being formed of a minimum number of parts.

Another object of this invention is to provide a disk wheel comprising a solid pressed steel or stamped metal disk member, and a series of removable bracket members formed of pressed steel or suitable stamped metal, said disk member being rigidly secured to one section of the rim and said bracket member being fixedly secured to the other section of the wheel rim.

A further object of the invention is to so construct each member that they may be snugly and accurately fitted together, with the disk member forming a strong and reliable support for the bracket members, said members being secured together with a suitable number of fastening bolts and nuts to form a completed wheel.

Further objects of the invention are to so construct my improved wheel that any one unskilled in the art may readily and quickly remove a punctured or worn tire and replace it with a new one; to form a solid steel wheel having an opening through the center thereof for the reception of the vehicle axle; to form an offset lug at each of the slitted portions of the steel disk serving as a support for each of the bracket members, and to form the rim of two sections with a portion of the steel disk riveted to one section and each bracket member riveted to the other section of the rim.

The foregoing and such other objects as may appear from the ensuing description are accomplished by the construction, arrangement, location and combination of the several parts hereinafter more fully described, illustrated by the accompanying drawings, and more particularly set forth in the claims appended hereto, it being understood that slight changes in the precise shape, proportions and minor details of the construction may be resorted to without departing from the spirit or sacrificing any of the advantages of the invention.

In the accompanying drawings forming a part of this specification, it will be seen that:—

Figure 1 is a side elevation of the novel wheel embodying my invention, and

Figure 2 is a sectional elevation taken in the plane of the dotted lines 2—2, Figure 1.

In the embodiment of my invention as illustrated, it will be seen that the numeral 1 designates the pressed or stamped steel disk member of the wheel, said disk member being rigidly and fixedly secured to the well known hub and flange of the Ford wheel by the fastening bolts 2 and securing nuts 3.

It will be perceived that the disk member 1 is provided with horizontal slits 4 therethrough, and vertical slits 5, at five different points near its peripheral portion, and at each of the horizontal slits a portion of the said member is forced or pressed outwardly to form a lug 6, the upper edge portion of which is adapted to rest in contact with the lower end portion of each of the five bracket members 7, thereby constituting a lug support for each bracket member, each of the latter members being formed with an upright portion 8 and a lateral extension 9 at its outer end which is fixedly and securely riveted to one section 10 of the rim of the wheel, while the upright portion 11 of the disk has a lateral extension 12 which is rigidly and securely riveted to the other section 13 forming the wheel rim, and the upright portions 8 of each bracket member and the upright portion of the steel disk at the five points hereinbefore referred to are firmly, rigidly and securely fastened together by the fastening bolts 14 and the securing nuts 15, as clearly shown in Fig. 2.

It will be observed that the use of a felly in connection with a wheel of this type is entirely dispensed with, and the five bracket members are utilized, a portion of each bracket being rigidly secured to one half of the wheel rim at one side of its central portion, and the other portion of each bracket being firmly fastened to the steel disk member, the middle portion of the rim being firmly supported by the laterally extended portion 12 of steel disk which is riveted to the rim at the other side of its central portion whereby the two sections of the rim are properly and securely held together with the central portion firmly supported by the extension 12 forming a part of the steel disk.

The steel disk is formed at any suitable or desirable point with a stamped or pressed offset 16 for the reception of the air valve usually connected with the pneumatic tire commonly employed in connection with this type of construction of wheel said offset partially surrounding said air valve when the tire is properly attached to the wheel rim and serving as a protection for the said valve which will be readily understood.

It will be evident that the steel disk, brackets and rim are preferably formed of pressed or stamped steel, and that the said parts may be of any suitable or desired thickness to produce a wheel of the required strength, durability and stability.

It will also be readily obvious that the well known balloon tire, or any other desirable tire may be suitably secured upon the rim of the wheel between the extensions 17 and 18.

With the construction of wheel hereinbefore described, to mount the tire upon the rim it is simply necessary to remove the bolts 14 and detach one of the sections such as 10. The tire casing may then be slipped upon the other section of the rim, after which the section 10 is replaced and clamped by the engagement and tightening of the bolts 14 and the securing nuts 15.

Having thus described my invention what I claim and desire to secure by Letters Patent is:—

1. A wheel of the character described, comprising a pressed steel disk member having a central opening therethrough, and formed with a series of horizontal and vertical slits therethrough, an offset lug formed at each horizontal slit, and a series of bracket members secured to said disk and a section of the wheel rim.

2. A wheel of the character described, comprising a solid metal disk member formed with a central opening and a series of horizontal and vertical slits therethrough, an extended lug formed at each horizontal slit, and a series of bracket members secured to the upright portion of said disk and to one section of the wheel rim.

3. A wheel of the character described, comprising a rim formed of two sections, a pressed steel disk member formed with a central opening and a series of horizontal and vertical slits therethrough, an extended supporting lug formed at each horizontal slit, a series of bracket members secured to the upright portion of said disk and to one section of the rim, and a lateral extension forming the periphery of the disk secured to the other section of the rim and constituting a supporting means for the center of said rim.

4. A wheel of the character described, comprising a steel disk member formed with a central opening and a series of horizontal and vertical slits therethrough, a laterally extended supporting lug formed at each horizontal slit, a series of bracket members secured to the upright portion of the disk and one section of the rim with the lower end of each bracket member in contact with said lug, and a lateral extension forming the periphery of said disk, said extension being secured to the other section of the rim and forming a support for the middle portion of the wheel rim.

HARRY C. ODENKIRK.